RADIO RECEIVING APPARATUS

Filed Dec. 29, 1948 2 SHEETS—SHEET 1

ROBERT ADLER
*INVENTOR.*
BY [signature]
HIS AGENT

ROBERT ADLER
*INVENTOR.*
BY
HIS AGENT

Patented Oct. 28, 1952 2,616,034

UNITED STATES PATENT OFFICE 2,616,034

RADIO RECEIVING APPARATUS

Robert Adler, Chicago, Ill., assignor to Zenith Radio Corporation, a corporation of Illinois Application December 29, 1948, Serial No. 67,985

5 Claims. (Cl. 250—20)

Figures 1, 2:
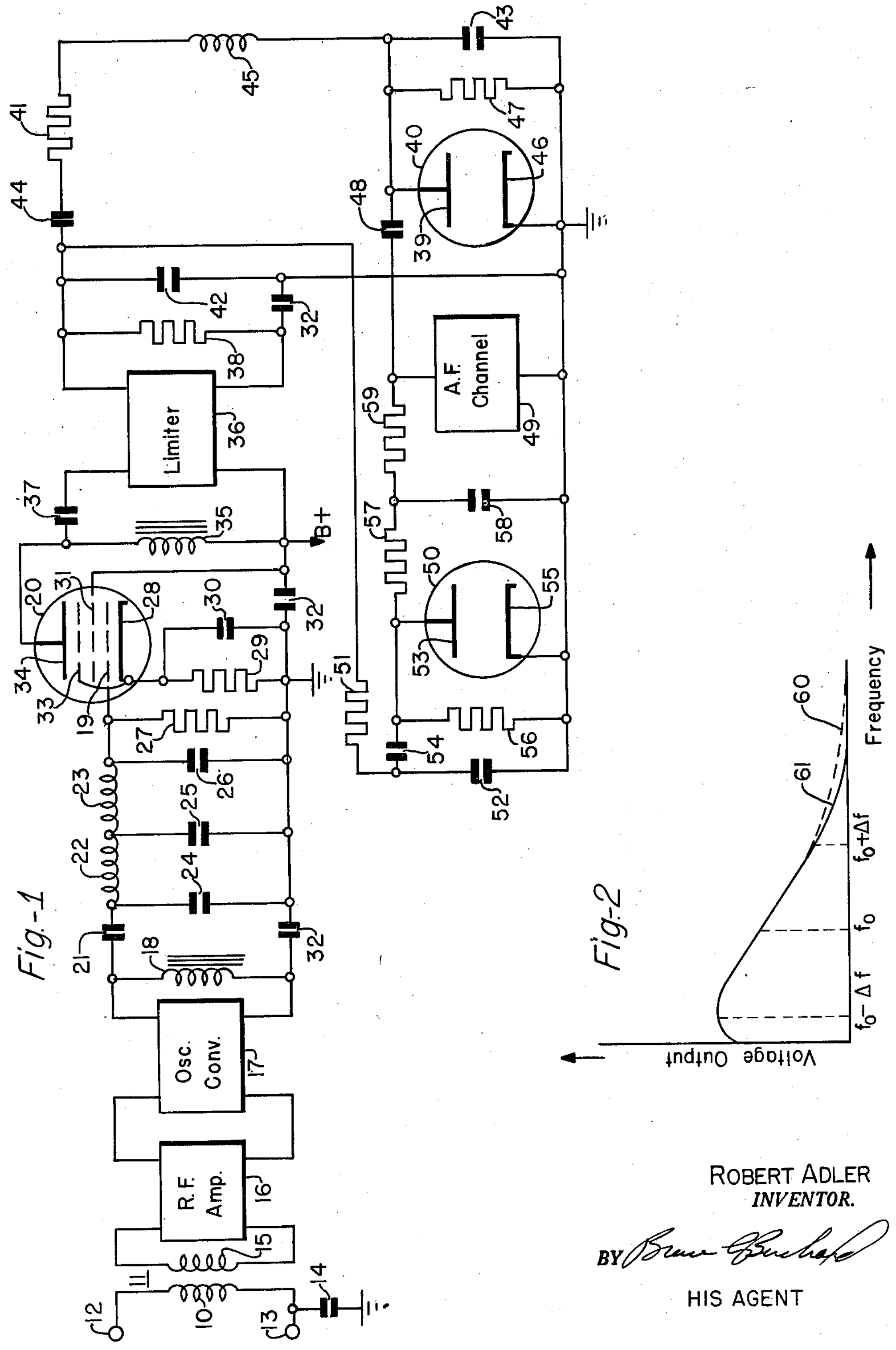

This invention relates to radio receiving apparatus and more particularly to such apparatus of the superheterodyne type.

It is an important object of the present invention to provide a simplified superheterodyne radio receiver in which no critical adjustment is required in the intermediate-frequency channel.

It is a further object of the invention to provide a simplified receiver in which circuit elements having practical manufacturing tolerances may be employed without adjustment in the intermediate-frequency channel in place of the customary intermediate-frequency transformers.

It is a further object of the invention to provide a receiver in which improved gain and stability are achieved in the intermediate-frequency channel.

Still a further object of the invention is to provide a superheterodyne receiver having an intermediate-frequency channel which is not subject to problems of regeneration encountered in conventional receivers.

Yet another object of the invention is to provide an improved superheterodyne receiver for frequency modulated carrier waves which is free of undesirable skirt responses encountered in conventional frequency modulation receivers.

Radio broadcasting in general in the United States is regulated under the close supervision of the Federal Communications Commission. In certain types of services, and particularly in frequency modulation broadcasting, the frequency separation between adjacent carrier frequencies in any one locality is limited by the Federal Communications Commission to a predetermined minimum in order to minimize interference between adjacent stations. Customary practice today is to employ radio receivers of the superheterodyne type to receive such broadcasts, and it is conventional to employ an intermediate-frequency having a value greater than one-half the width of the total band allocated by the Federal Communications Commission for frequency modulation broadcasting. This is done in order to provide a sufficient frequency separation between the desired response and the image that the selectivity of the radio-frequency amplifier will render the receiver singly responsive to each station. Similar considerations apply in the case of television broadcasting.

With the present frequency modulation band covering carrier frequencies from 88 to 108 megacycles per second, such practice dictates the use of an intermediate-frequency of the order of 10 megacycles per second or higher. The modulation band width is limited by the Federal Communications Commission to a maximum of 150 kilocycles per second. Since the modulation band width is a small fraction of the intermediate-frequency, the intermediate-frequency channel must be very carefully adjusted; for example, a detuning of one-half of 1% shifts the center frequency by an amount equal to 33% of the total modulation band width. The use of a lower intermediate-frequency is desirable from the standpoint of stability and obtainable intermediate-frequency gain, but lower intermediate-frequencies have not been used for the reason that interference may result between the desired response of one station and the image response of the next adjacent station. The present invention represents a radical departure from conventional practice in the choice of a particular intermediate-frequency, much lower than that ordinarily used, which affords the advantages of improved stability, simplicity, and gain in the intermediate-frequency channel while affording a clear separation between the desired response of one station and the image response of the next adjacent station.

In accordance with the present invention, there is provided apparatus for receiving signal information from any one of a number of broadcasting stations having a predetermined minimum carrier frequency separation and individually having desired modulation components only within a frequency band of width less than one-half of the predetermined minimum carrier frequency separation. The intermediate-frequency channel of the apparatus consists entirely of aperiodic circuits and includes a low-pass filter selective to an intermediate-frequency band of width substantially equal to that of the modulation component frequency band, and the intermediate-frequency band is centered with respect to a frequency substantially one-quarter of the minimum carrier frequency separation. The receiver also comprises an audio frequency amplifier and a frequency detector coupled between the intermediate frequency channel and the audio frequency amplifier. The frequency detector includes a frequency responsive discriminator network which is substantially unresponsive to frequencies above the intermediate frequency band and has a voltage output versus frequency characteristic which is substantially linear throughout the intermediate frequency band.

Figures 3, 4:
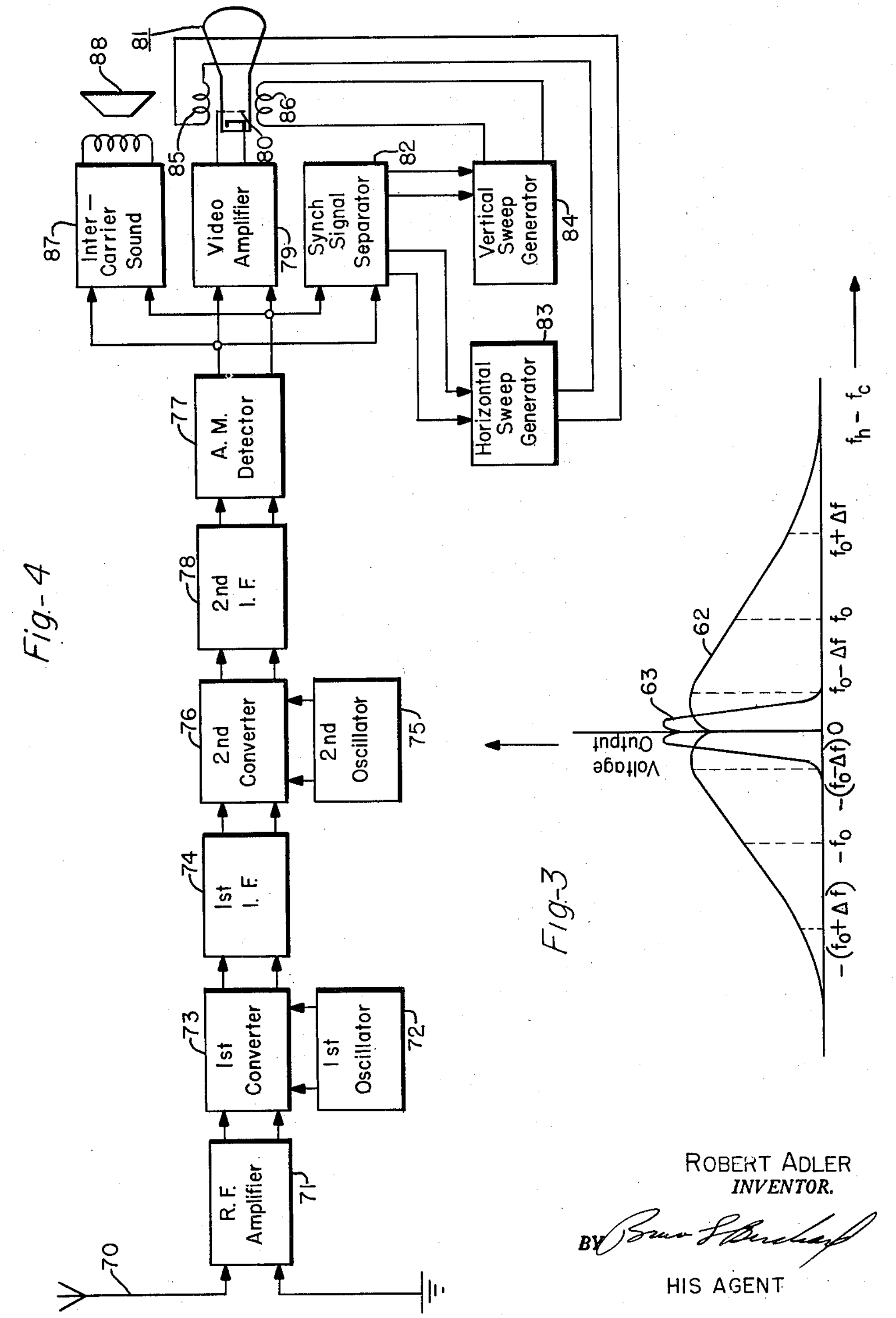

The features of the present invention which are believed to be novel are set forth with particularity in the appended claims. The invention, together with further objects and advantages thereof, may more readily be understood, however, by reference to the following description taken in connection with the accompanying drawings, in which:

Figure 1 is a schematic diagram of a frequency modulation radio receiver embodying the present invention, Figure 2 is a graphical representation of a characteristic of the frequency detector of the receiver of Figure 1, Figure 3 is a graphical representation useful in explaining the operation of the receiver of Figure 1, and Figure 4 is a block diagram of a television receiver constructed in accordance with the present invention.

With reference to Figure 1, there is shown in schematic form a frequency modulation radio receiver of the superheterodyne type which embodies the present invention. Incoming frequency modulated carrier waves are applied to the primary 10 of an input transformer 11 by means of a pair of input terminals 12 and 13 coupled to a suitable antenna system (not shown) which may comprise nothing more than short wire leads. Input terminal 13 is bypassed to ground by means of a bypass condenser 14. Signals induced in the secondary 15 of input transformer 11 are applied to a radio-frequency amplifier 16 which may be of conventional construction. Amplified radio-frequency signals from amplifier 16 are frequency converted by an oscillator-converter stage 17. Intermediate-frequency signals from oscillator-converter 17 appear across load inductor 18 and thence are supplied to the input grid 19 of an electron discharge device 20 through a coupling condenser 21 and a network consisting of series inductors 22 and 23 and shunt condensers 24, 25, and 26. A grid resistor 27 is supplied to furnish a direct current return to ground for input grid 19. Cathode 28 of device 20 is connected to ground through a cathode bias resistor 29 and bypass condenser 30 in the usual manner. Screen grid 31 of device 20 is connected to a suitable source of positive unidirectional operating potential, conventionally designated B+, which is bypassed to ground by means of condensers 32. Suppressor grid 33 of device 20 is connected to cathode 28. Positive operating potential is supplied to the anode 34 of device 20 from B+ through a load inductor 35.

Amplified intermediate-frequency signals appearing across load inductor 35 are supplied to a limiter 36, which may be of conventional construction, through a coupling condenser 37. Output signals of intermediate frequency and limited in amplitude appear across a load resistor 38 which is connected across the output terminals of limiter 36.

The amplitude limited signals appearing across load resistor 38 are applied to the anode 39 of a rectifier 40, here shown as a diode, through a frequency-responsive network consisting essentially of load resistor 38, series resistor 41, and shunt condensers 42 and 43. A blocking condenser 44 is provided to isolate diode anode 39 from limiter 36 for direct currents. A series inductor 45 may also be supplied for a purpose to be explained hereinafter. Cathode 46 of diode 40 is connected to ground, and a load resistor 47 is connected between anode 39 and cathode 46. The rectified voltage appearing across load resistor 47 is applied through a coupling condenser 48 to the audio-frequency channel 49, which may comprise an audio frequency amplifier, a power amplifier, and a speaker, which may all be of conventional construction.

A squelch circuit is coupled between limiter 36 and audio-frequency channel 49 and comprises a rectifier 50, here shown as a diode, and a low-pass filter comprising a series resistor 51 and a shunt condenser 52. The output from the low-pass filter is coupled to the anode 53 of diode 50 through a coupling condenser 54. Cathode 55 of diode 50 is grounded, and a load resistor 56 is connected between anode 53 and cathode 55. Audio-frequency components of the rectified voltage appearing across resistor 56 are filtered by means of a series resistor 57 and a shunt condenser 58, and the direct current output from diode 50 is applied to the audio-frequency channel 49 through a coupling resistor 59.

To facilitate an understanding of the operation of the receiver of Figure 1, the present requirements of the Federal Communications Commission, namely that the minimum adjacent carrier frequency separation must be 400 kilocycles per second and the maximum modulation component band width must be 150 kilocycles per second, will be assumed. In accordance with the present invention, the intermediate-frequency channel is made selective to an intermediate frequency band having a width (from $f_0-\Delta f$ to $f_0+\Delta f$, where $\Delta f$ represents the maximum frequency deviation of the input signal from the input signal center frequency $f_0$) substantially equal to that of the modulation component frequency band and being centered with respect to a frequency $f_0$ of substantially one-quarter of the minimum carrier frequency separation. Thus, if desired modulation components are contained within a frequency band having a width of 150 kilocycles per second, the intermediate frequency channel is made selective to an intermediate frequency band having a width of 150 kilocycles per second and being centered about a frequency of 100 kilocycles per second.

To this end, the load for converter 17 comprises an inductor 18 followed by a two-section inductance capacitance filter which comprises inductors 22 and 23 and condensers 24, 25, and 26. With this arrangement, the selectivity of the intermediate-frequency channel is determined at the low end by the inductance of inductor 18 and the capacitance of condenser 21 and at the high end by the cut-off frequency of the inductance-capacitance filter. Under the assumed circumstances, therefore, the intermediate frequency band is designed to include frequencies from 25 to 175 kilocycles per second.

The intermediate-frequency signal is then applied to the input grid 19 of intermediate-frequency amplifier tube 20, the output circuit of which comprises inductor 35 in place of the usual intermediate-frequency transformer. Because the intermediate frequency is only 100 kilocycles per second instead of the conventional 10.7 megacycles per second, the stability and gain obtainable within amplifier tube 20 are greatly increased, and the regeneration problems are substantially eliminated.

The output from the intermediate-frequency amplifier 20 is limited in amplitude by limiter 36 and is then applied to the input of a frequency detector comprising diode 40 and a frequency responsive network which consists essentially of resistors 38 and 41 and condensers 42 and 43. The output voltage versus frequency characteristic of such a frequency detector is shown graphically in Figure 2, in which voltage output is plotted as ordinate against frequency as abscissa. Curve 60 represents the detection characteristic for a detector comprising only diode 40, resistors 38 and 41, and condensers 42 and 43. The addition of series inductor 45 effects a sharper cutoff and results in a detection characteristic as shown graphically in curve 61.

A detector, exhibiting the response characteristic of curve 61, is substantially linear throughout the intermediate-frequency band from $f_0-\Delta f$ to $f_0+\Delta f$ and is substantially unresponsive to frequencies above the intermediate-frequency band. It therefore follows that the output from the frequency detector represents an audio-frequency signal which has an essentially linear relation with respect to the frequency modulation of the impressed intermediate-frequency signal. This, of course, is most desirable for faithful signal reproduction. Because the detector is substantially unresponsive to frequencies above the intermediate-frequency band, undesired skirt responses are effectively eliminated.

In order further to understand the operation of the invention, there is shown in Figure 3 a graphical representation of the voltage output of the frequency detector plotted as a function of the difference between the local oscillator frequency $f_h$ and the carrier frequency $f_c$ of the information to be received. Curve 62 represents the characteristic of the frequency detector. As the local oscillator is tuned toward and through the carrier frequency, two responses are obtained, one at intermediate frequency $-f_0$ when the local oscillator frequency is lower than the carrier frequency and one at intermediate frequency $+f_0$ when the local oscillator frequency is higher than the carrier frequency. These two responses are of substantially equal strength, and the receiver may be tuned to either with equally good results. Because of the relations between the minimum carrier frequency separation, the width of the modulation component frequency band, and the center frequency of the intermediate-frequency band, there is a clear separation between the desired response of one station and the image response of the next adjacent station, and no undesirable interference or confusion is encountered.

In the region between the two intermediate frequency response bands, from frequency $-(f_0-\Delta f)$ to frequency $f_0-\Delta f$, the beat frequencies between the local oscillator frequency and the carrier frequency traverse an audible range. This phenomenon is manifested as a whistle when the receiver is tuned between the two responses for the station. In order to eliminate undesirable reproduction of the audible beat notes, a squelch circuit is coupled between the intermediate-frequency channel and the audio-frequency amplifier (see Figure 1). The squelch circuit comprises a low-pass filter consisting of series resistor 51 and shunt condenser 52, the time constant of which is suitably chosen so that only audio frequencies are passed; for example, a time constant of 100 microseconds may be used. A diode rectifier 50 is coupled to the output of the low-pass filter by means of a coupling condenser 54, and the rectified output from diode 50 appears across resistor 56. This rectified output contains a unidirectional squelch potential which is applied to the audio-frequency amplifier to render it inoperative in response to the appearance in the intermediate-frequency channel of frequencies below the intermediate-frequency band. Resistor 57 and condenser 58 serve to filter out from the rectified voltage developed by diode 50 any audio-frequency components, so that only the unidirectional squelch voltage is applied to the audio-frequency amplifier.

Referring again to Figure 3, curve 63 represents the unidirectional voltage output from the squelch circuit as a function of the difference between the local oscillator frequency $f_h$ and the carrier frequency $f_c$. Examination of curves 62 and 63 reveals that the detector is substantially unresponsive to frequencies above the intermediate-frequency band, and that a unidirectional squelch voltage is developed to render the audio-frequency amplifier inoperative in response to the appearance in the intermediate frequency channel of frequencies below the intermediate-frequency band.

Purely by way of illustration, and in no sense by way of limitation, the following circuit component values may be employed in the embodiment of Figure 1:

| | |
|---|---|
| Electron discharge device 20 | Type 12AV6 |
| Load inductor 18 | 0.25 henry |
| Inductors 22 and 23 | 40 millihenries each |
| Condenser 24 | 14 micro-microfarads |
| Condenser 25 | 36 micro-microfarads |
| Condenser 26 | 12 micro-microfarads |
| Resistor 27 | 82,000 ohms |
| Inductor 35 | 0.38 henry |
| Resistor 38 | 47,000 ohms |
| Condenser 42 | 50 micro-microfarads |
| Resistor 41 | 47,000 ohms |
| Condenser 43 | 25 micro-microfarads |
| Resistor 47 | 150,000 ohms |
| Resistor 51 | 100,000 ohms |
| Condenser 52 | 0.001 microfarad |
| Resistor 56 | 1.5 megohms |
| Resistor 57 | 470,000 ohms |
| Condenser 58 | 0.05 microfarad |
| Resistor 59 | 470,000 ohms |

With these component values, the intermediate-frequency channel is selective to an intermediate-frequency band which includes frequencies from 25 to 175 kilocycles per second and which is centered about an intermediate frequency of 100 kilocycles per second. Such a receiver is particularly useful for the reception of frequency modulated signals in the portion of the frequency spectrum from 88 to 108 megacycles per second, which constitutes the present frequency modulation broadcast band and in which the minimum carrier frequency separation specified by the Federal Communications Commission in any one locality is 400 kilocycles per second.

With reference to Figure 4, there is shown in block diagram form a television receiver which embodies the present invention. Composite video signals are intercepted by an antenna 70 and are applied to a conventional radio-frequency amplifier 71. The amplified output of radio-frequency amplifier 71 is mixed with the output of a first local oscillator 72 in a first converter stage 73, and the intermediate-frequency output is applied to the first intermediate-frequency stage 74. The output from intermediate-frequency channel 74 is mixed with the output from a second local oscillator 75 in a second converter stage 76, and the output of second converter 76 is transmitted to an amplitude modulation detector 77 through a second intermediate-frequency stage 78. The output from detector 77 is amplified in video amplifier 79 and applied to the control grid 80 of a conventional cathode ray tube 81. Synchronizing signals are fed from the output of detector 77 to a synchronizing signal separator 82 and thence to the respective sweep generators 83 and 84. The output of horizontal sweep generator 83 is applied to the horizontal deflection coil 85 associated with picture tube 81, and the output of the vertical sweep generator 84 is applied to the vertical deflection coil 86. An intercarrier sound system 87 and a speaker 88 are also coupled to the output of detector 77.

In the case of television broadcasting, as with frequency modulation broadcasting, the Federal Communications Commission limits the minimum carrier frequency separation to a predetermined value, and the modulation component frequency band width is also limited by the Federal Communications Commission to a value less than one-half of the minimum carrier frequency separation. In accordance with the present invention, the receiver is provided with an intermediate-frequency channel 74 which is selective to an intermediate-frequency band having a width substantially equal to that of the modulation component frequency band and being centered with respect to a frequency of substantially one-quarter of the predetermined minimum carrier frequency separation. Intermediate frequency channel 74 may include a filter for obtaining the required selectivity and an amplifier for obtaining intermediate-frequency gain. In order that a conventional amplitude modulation detector 77 may be used to demodulate the intermediate-frequency signal, the output of intermediate-frequency channel 74 is converted to a conventional intermediate frequency by the second converter 76. The second intermediate-frequency stage may consist only of a filter for obtaining the desired selectivity characteristics.

In other respects, the operation of the receiver of Figure 4 is conventional.

Although the invention has been shown and described particularly in connection with the present regulations of the Federal Communications Commission, it is apparent that these regulations may be changed or that new regulations governing newly allocated portions of the frequency spectrum may be imposed. Therefore, it is contemplated that the present invention may be employed in connection with any broadcasting service wherein the maximum modulation component frequency band width is set, either by law or by custom, at a value less than one-half of the minimum carrier frequency separation.

In the appended claims, the specification that the intermediate-frequency band is centered with respect to a frequency of substantially one-quarter of the minimum carrier frequency separation is to be construed as meaning that the intermediate-frequency band center frequency does not differ from one-quarter of the minimum carrier frequency separation by more than one-half of the difference between the modulation component band width and one-half of the minimum carrier frequency separation.

While the invention has been shown and described in connection with certain preferred embodiments, it is to be understood that numerous modifications and variations may be made, and it is contemplated in the appended claims to cover all such modifications and variations as fall within the true spirit and scope of the invention.

I claim:

1. Apparatus for receiving signal information from any one of a plurality of frequency modulated carrier waves having a minimum carrier frequency separation of a predetermined value and individually including desired modulation components within a frequency band having a width less than one-half of said predetermined value, said apparatus comprising: an intermediate-frequency channel consisting entirely of aperiodic circuits and including a low-pass filter selective to an intermediate-frequency band having a width substantially equal to that of said modulation component frequency band and centered with respect to a frequency of substantially one-quarter of said predetermined value; an audio-frequency amplifier; and a frequency detector coupled between said intermediate-frequency channel and said audio-frequency amplifier and including a frequency-responsive discriminator network which is substantially unresponsive to frequencies above said intermediate-frequency band and which has a voltage output versus frequency characteristic which is substantially linear throughout said intermediate-frequency band.

2. Apparatus for receiving signal information from any one of a plurality of frequency modulated carrier waves having a minimum carrier frequency separation of a predetermined value and individually including desired modulation components within a frequency band having a width less than one-half of said predetermined value, said apparatus comprising: an intermediate-frequency channel consisting entirely of aperiodic circuits and including a low-pass filter selective to an intermediate-frequency band having a width substantially equal to that of said modulation component frequency band and centered with respect to a frequency of substantially one-quarter of said predetermined value; an audio-frequency amplifier; and a frequency detector coupled between said intermediate-frequency channel and said audio-frequency amplifier and including a resistance-capacitance discriminator network which is substantially unresponsive to frequencies above said intermediate-frequency band and which has a voltage output versus frequency characteristic which has a substantially linear negative slope throughout said intermediate-frequency band.

3. Apparatus for receiving signal information from any one of a plurality of frequency modulated carrier waves having a minimum carrier frequency separation of 400 kilocycles per second and individually including desired modulation components within a frequency band having a width less than 200 kilocycles per second, said apparatus comprising: an intermediate-frequency channel consisting entirely of aperiodic circuits and including a low-pass filter selective to an intermediate-frequency band having a width substantially equal to that of said modulation component frequency band and centered with respect to a frequency of substantially 100 kilocycles per second; an audio-frequency amplifier; and a frequency detector coupled between said intermediate-frequency channel and said audio-frequency amplifier and including a rectifier and a frequency responsive network consisting essentially of resistance and capacitance elements, said network being substantially unresponsive to frequencies above said intermediate-frequency band and having a voltage output versus frequency characteristic which has a negative slope and which is substantially linear throughout said intermediate-frequency band.

4. Apparatus for receiving signal information from any one of a plurality of frequency modulated carrier waves having a minimum carrier frequency separation of a predetermined value and individually including desired modulation components within a frequency band having a width less than one-half of said predetermined value, said apparatus comprising: an intermediate-frequency channel consisting entirely of aperiodic circuits and including a low-pass filter selective to an intermediate-frequency band having a width substantially equal to that of said modulation component frequency band and centered with respect to a frequency of substantially one-quarter of said predetermined value; an audio-frequency amplifier; a frequency detector coupled between said intermediate-frequency channel and said audio-frequency amplifier and including a frequency responsive discriminator network which is substantially unresponsive to frequencies above said intermediate-frequency band and which has a substantially linear voltage output versus frequency characteristic throughout said intermediate-frequency band; and a squelch circuit coupled between said intermediate-frequency channel and said audio-frequency amplifier and including a rectifier and a low pass filter for developing a unidirectional squelch voltage to render said audio-frequency amplifier inoperative in response to the appearance in said intermediate-frequency channel of frequencies below said intermediate-frequency band.

5. Apparatus for receiving signal information from any one of a plurality of frequency modulated carrier waves having a minimum carrier frequency separation of 400 kilocycles per second and individually including desired modulation components within a frequency band having a width less than 200 kilocycles per second, said apparatus comprising: an intermediate-frequency channel consisting entirely of aperiodic circuits and including a low-pass filter selective to an intermediate-frequency band having a width substantially equal to that of said modulation component frequency band and being centered with respect to a frequency of substantially 100 kilocycles per second; an audio-frequency amplifier; a frequency detector coupled between said intermediate-frequency channel and said audio-frequency amplifier and including a resistance-capacitance discriminator network which is substantially unresponsive to frequencies above said intermediate-frequency band and which has a voltage output versus frequency characteristic which has a substantially linear negative slope throughout said intermediate-frequency band; and a squelch circuit coupled between said intermediate-frequency channel and said audio-frequency amplifier and including a rectifier and a low pass filter for developing a unidirectional squelch voltage to render said audio-frequency amplifier inoperative in response to the appearance in said intermediate-frequency channel of frequencies below said intermediate-frequency band.

ROBERT ADLER.

REFERENCES CITED

The following references are of record in the file of this patent:

UNITED STATES PATENTS

| Number | Name | Date |
|---|---|---|
| 1,361,487 | Osborne | Dec. 7, 1920 |
| 1,878,614 | Wheeler | Sept. 20, 1932 |
| 2,035,176 | McLennan | Mar. 24, 1941 |
| 2,261,643 | Brown | Nov. 4, 1941 |
| 2,350,869 | Bliss | June 6, 1944 |
| 2,343,115 | Noble | Feb. 29, 1944 |
| 2,390,209 | D'Orio | Dec. 4, 1945 |

OTHER REFERENCES

Principles of Radio Engineering by Glasgow, 1st ed., June 8, 1936, pages 380 to 386.